United States Patent [19]
Paquette

[11] Patent Number: 5,517,310
[45] Date of Patent: May 14, 1996

[54] METHOD AND APPARATUS FOR OBTAINING AND ANALYZING AN IMAGE OF A ELONGATE SLOT

[75] Inventor: Eric W. Paquette, Walker, Mich.

[73] Assignee: Solar Turbines Incorporated, San Diego, Calif.

[21] Appl. No.: 269,330

[22] Filed: Jun. 30, 1994

[51] Int. Cl.$^6$ .................................................. G01B 11/24
[52] U.S. Cl. .......................... 356/375; 356/376; 382/152; 364/560; 364/571.02
[58] Field of Search ..................................... 356/375, 376, 356/2, 150, 73, 237; 382/1, 152; 364/559–560, 562–564, 571.02, 571.04, 571.05; 72/37

[56] References Cited

U.S. PATENT DOCUMENTS

| | | | |
|---|---|---|---|
| 4,555,798 | 11/1985 | Broadbent, Jr. et al. | 356/237 |
| 4,647,208 | 3/1987 | Breman | 356/375 |
| 4,908,782 | 3/1990 | Pekarek et al. | 364/560 |
| 4,982,438 | 1/1991 | Usami et al. | 356/376 |
| 4,988,201 | 1/1991 | Sugitani et al. | 356/376 |
| 5,073,819 | 12/1991 | Gates et al. | 364/560 |
| 5,104,216 | 4/1992 | Vokurka | 356/376 |
| 5,127,736 | 7/1992 | Neiheisel | 356/376 |
| 5,162,659 | 11/1992 | Diamond et al. | 356/376 |
| 5,247,463 | 9/1993 | Mancosu et al. | 364/562 |
| 5,291,270 | 3/1994 | Koch et al. | 356/376 |
| 5,307,150 | 4/1994 | Lecerf et al. | 356/376 |

*Primary Examiner*—Frank Gonzalez
*Assistant Examiner*—Jason D. Eisenberg
*Attorney, Agent, or Firm*—Alan J. Hickman

[57] ABSTRACT

An inspection device and method determines the accuracy of an irregular shaped elongate slot disposed through a piece part supported on an indexable turntable. The inspection device includes a movable illumination device for directing backlighting towards the piece part and illuminating the elongate slot, and a camera for taking a picture of the illuminated irregular shaped elongate slot and delivering an image of the irregular elongate slot. A vision system determines actual key characteristics (center coordinate value, angle value, area value, and true position value) of an image of the actual elongate slot and a monitor displays information corresponding to the actual and target values. The inspection device and method is primarily used to inspect slotted rings used in stators for gas turbine engines.

18 Claims, 9 Drawing Sheets

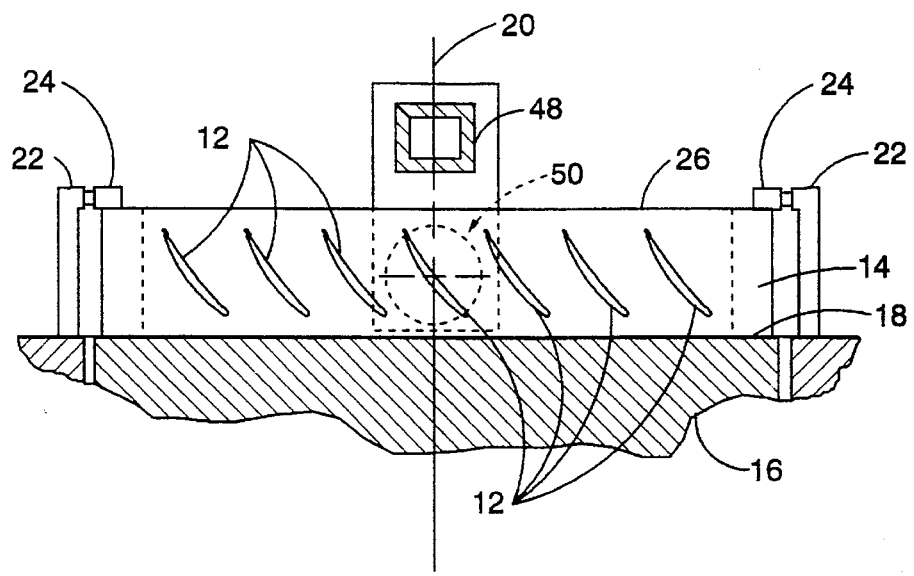
Fig_2_
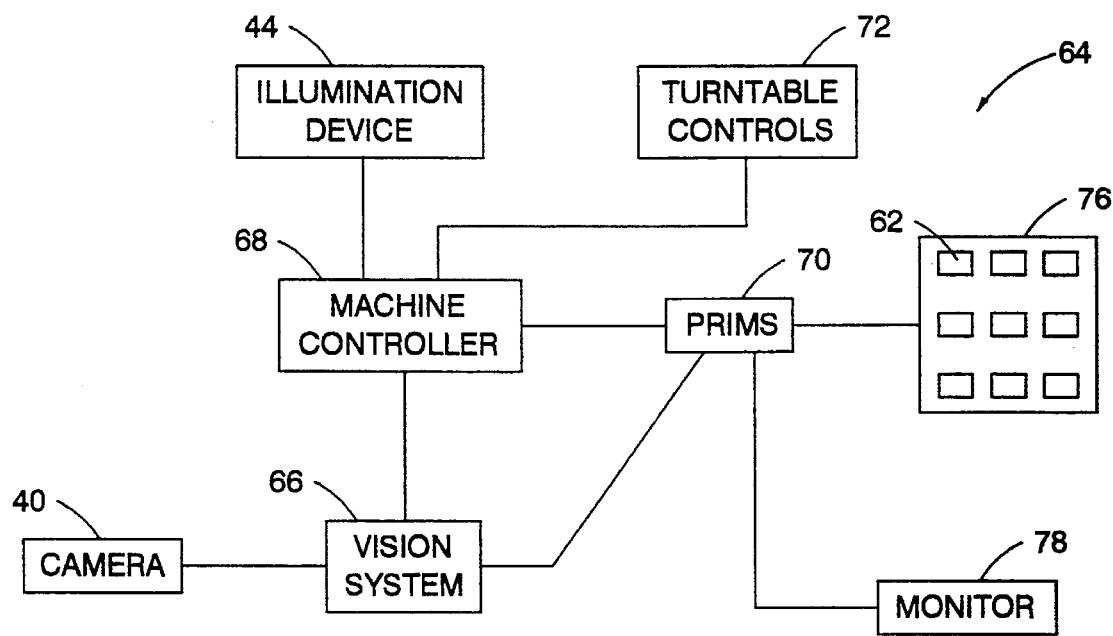
Fig_3_

| | Units | Actual | Target | Low Limit | High Limit |
|---|---|---|---|---|---|
| True Position | Thou. | XX.X | X.X | X.X | X.X |
| Hole 1 X Position | Thou. | XX.X | X.X | X.X | X.X |
| Hole 1 Y Position | Thou. | XX.X | X.X | X.X | X.X |
| Hole 1 Angle | Degree | X.XX | X.XX | X.XX | X.XX |
| Hole 1 Area | Sq. Th. | XX.X | X.X | X.X | X.X |

| | Units | Actual | Target | Low Limit | High Limit |
|---|---|---|---|---|---|
| True Position | Thou. | XX.X | X.X | X.X | X.X |
| Hole 2 X Position | Thou. | XX.X | X.X | X.X | X.X |
| Hole 2 Y Position | Thou. | XX.X | X.X | X.X | X.X |
| Hole 2 Angle | Degree | X.XX | X.XX | X.XX | X.XX |
| Hole 2 Area | Sq. Th. | XX.X | X.X | X.X | X.X |

Fig-4-

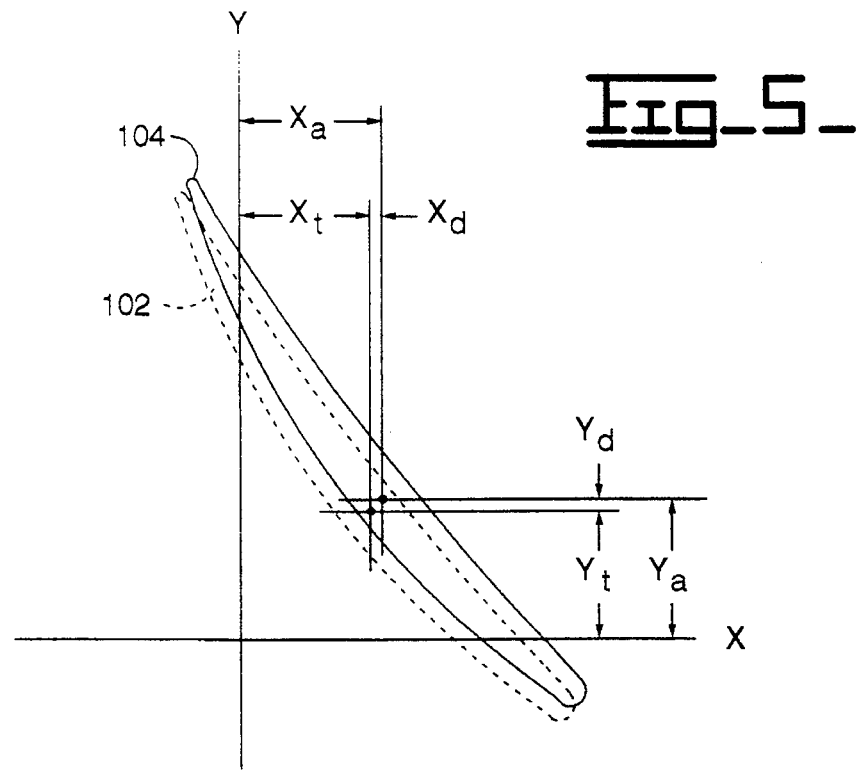
Fig_5_
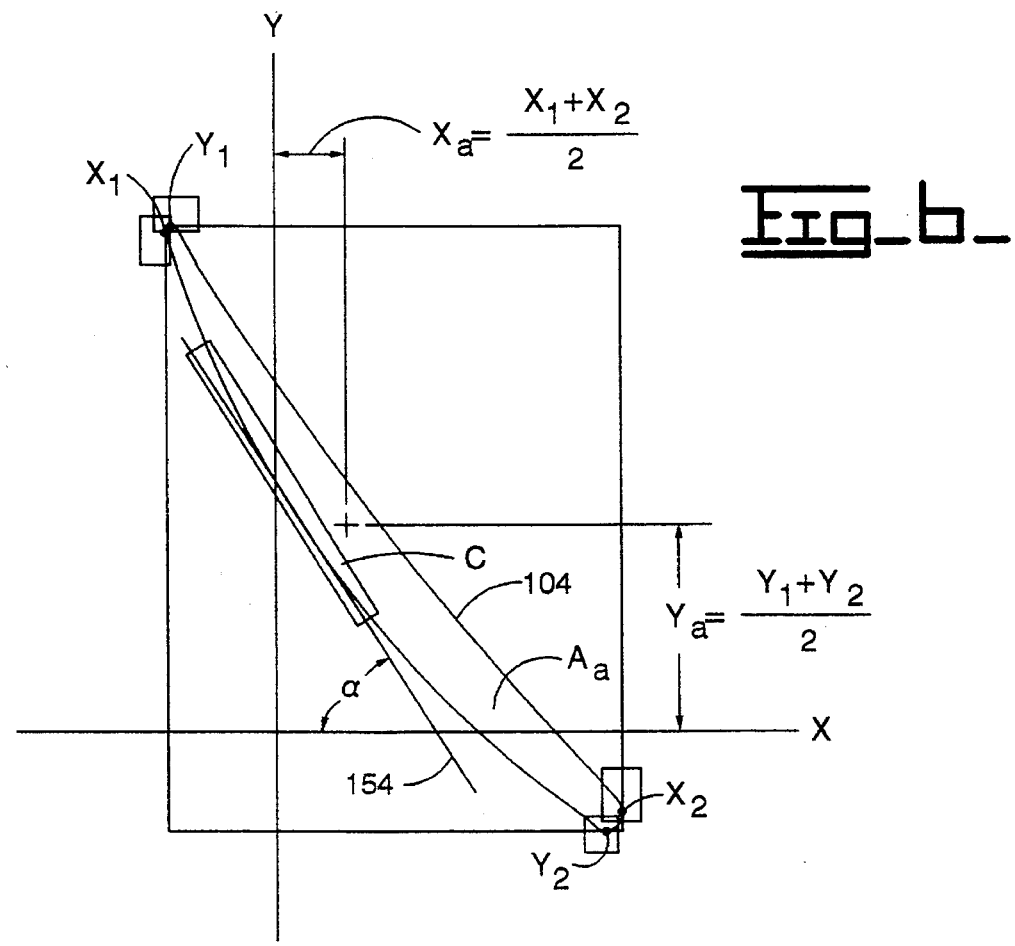
Fig_6_

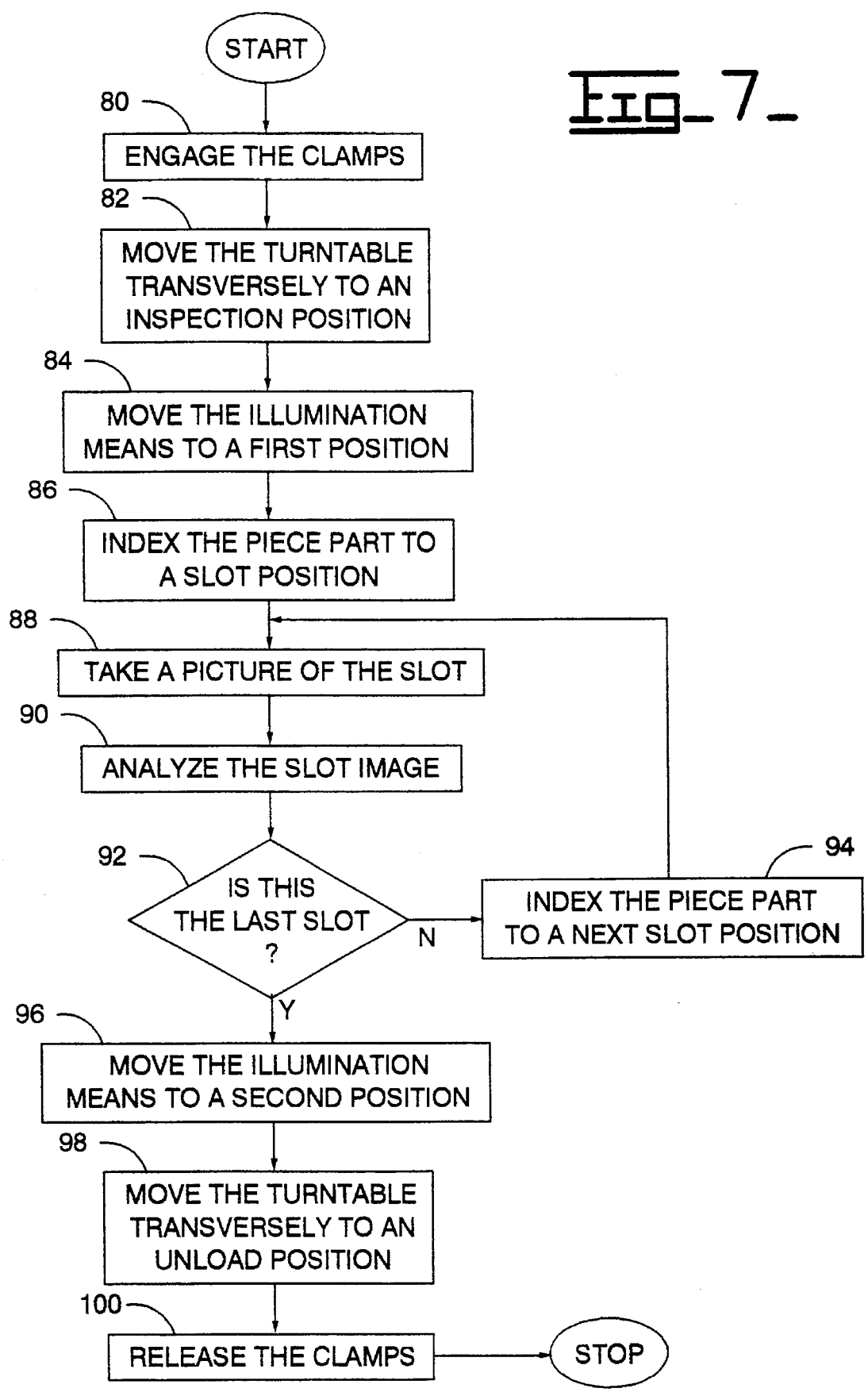
Fig_7_

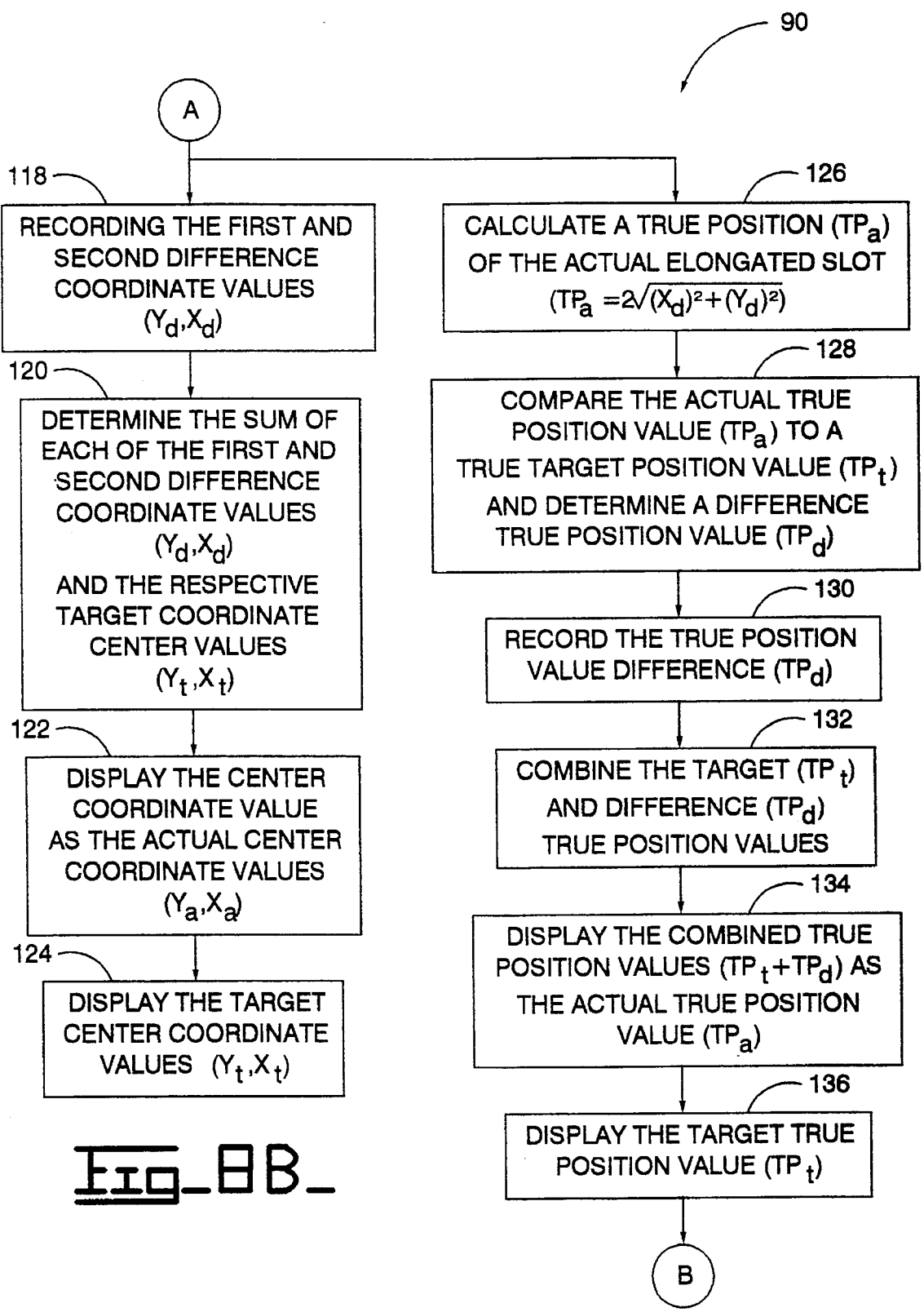
Fig_8B_

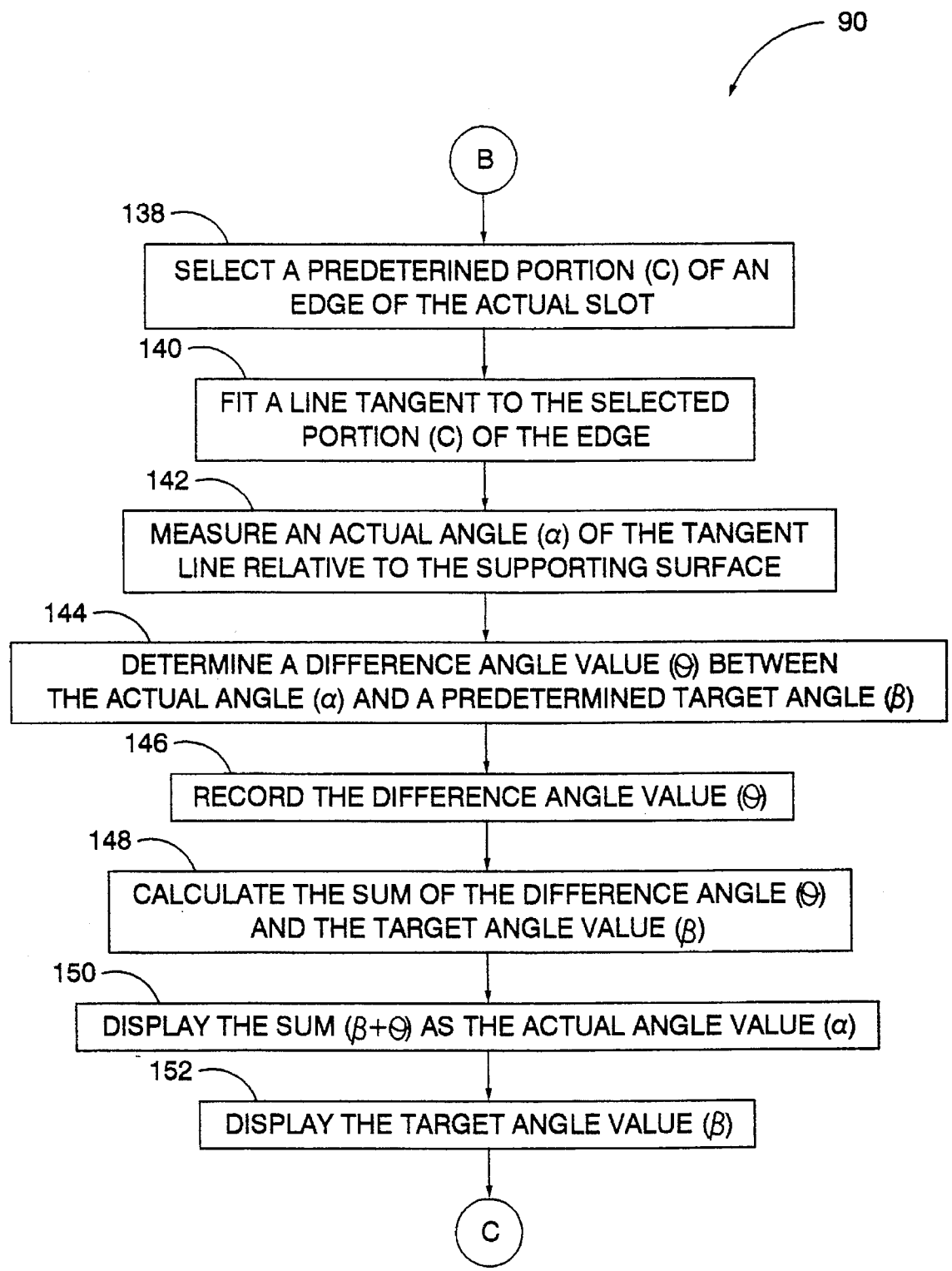
Fig_8C_

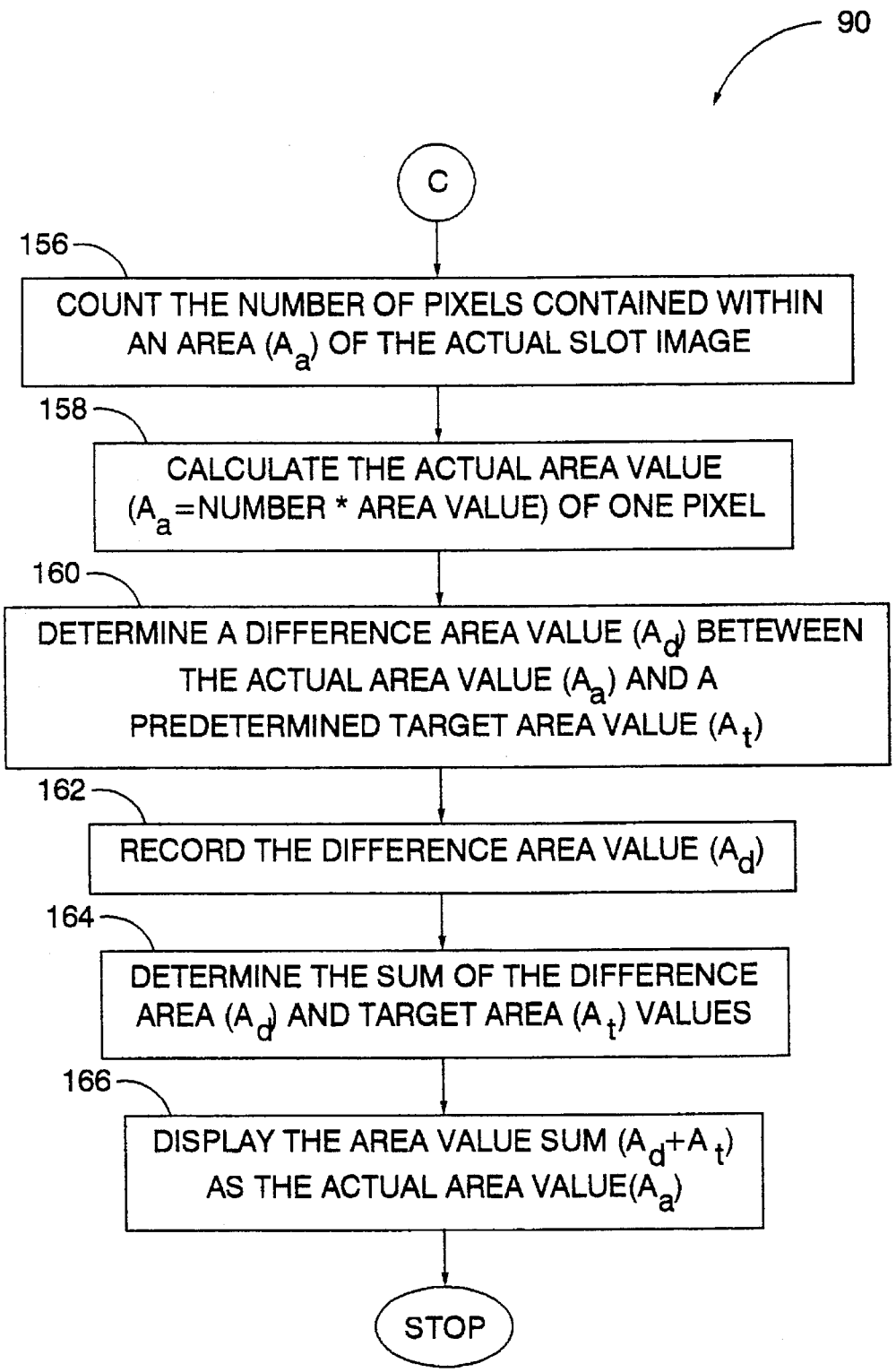
Fig_8D_

METHOD AND APPARATUS FOR OBTAINING AND ANALYZING AN IMAGE OF A ELONGATE SLOT

TECHNICAL FIELD

This invention relates to a device and method of inspecting elongate slots in a piece part and more particularly an apparatus and method for visually inspecting an image of an irregular shaped elongated slot and analyzing certain key characteristics of the irregular shaped elongated slot and displaying certain values related to the key characteristics.

BACKGROUND ART

A common practice used today to inspect the accuracy of position, size, orientation and shape of a plurality of holes, such as, equally spaced irregular shaped slots disposed in a piece part utilizes a manual mechanical comparative method. An example, of such a piece part includes a ring or shroud of a nozzle or stator of a gas turbine engine. The irregular shaped slots provide pilot holes for vanes of the stator or nozzle which are affixed by brazing. The manual inspection method requires that the slotted ring is optically magnified many times by a series of lenses, mirrors, and the like. The final magnification of many times size is overlaid by a transparent film upon which an outline of the target (nominal) irregular shaped slot is drawn. When the outline of the magnified actual slot lies within a preselected tolerance range of the outline of the target slot, the slot is determined by the examining person to be acceptable. Each slot of the slotted ring of slots is measured in this manner.

This manual technique has been used only when absolutely necessary because it takes a substantial amount of time to accurately position the piece part and accurately position the overlay relative to each magnified slot being inspected. It should be recognized that this technique also requires a significant amount of skill on the part of the person inspecting the piece part. As a result, the cost of each piece part is substantially increased. Further, such manual methods require a substantial amount of judgement on the part of the inspector which may result in unacceptable variations in tolerances between piece parts. These variations in tolerance can cause marginally acceptable piece parts to be scrapped or marginally unacceptable piece parts to be accepted. A marginally acceptable stator or nozzle can adversely affect the performance of the gas turbine engine in which it is installed. It is therefore evident that a method and apparatus for consistently inspecting a plurality of elongate slots disposed in a ring is required in order to improve the quality of inspection of each piece part. Such a method and apparatus would facilitate more frequent inspection of piece parts since the time to perform such an inspection would be substantially less.

One problem associated with inspecting an irregular shaped slot relates to the fact that the slot has no easily defined key characteristics or unique features. For example, an irregular shaped elongate slot lacks a true center, distinct opposite ends, parallel sides and the like. Therefore, key elements that could be significant in determining the accuracy of the irregular elongate slot, such as the geometric center, area, and angle of orientation are not readily determined. Therefore, an apparatus or method to automate or accurately the measure these parameters has not been pursued.

For those involved in punching irregular shaped slots in stator rings or shrouds, it would be beneficial to be able perform the inspection of the slots of the punched rings shortly after the punching process has been completed, in order to eliminate the step of accurately positioning the ring. This, however, seems to be unlikely as the lubricant used in the punching process would interfere with the use of any visual inspection device. A visual inspection device would become contaminated with lubricant dirt and the like. Further, in an environment such as this, lighting of the piece part for inspection purposes is inadequate. To provide adequate lighting in such an environment is plagued with problems and would cause one to abandon any thought of associating the inspection of the piece part with the punching apparatus.

The invention is directed to overcoming one or more of the problems as set forth above.

DISCLOSURE OF THE INVENTION

An inspection device for automatically determining the accuracy of an elongate slot disposed though a piece part comprises a turn table having a supporting surface and being adapted to support a piece part having an elongate slot disposed therethrough at a preselected position on the supporting surface relative to an axis of rotation of the supporting surface. An illumination device is provided for directing backlighting towards the piece part and illuminating the elongate slot. A camera is provided for taking a picture of the illuminated elongate slot and delivering an image of the elongate slot. The piece part is located between the camera and the illumination device. A first means is provided for receiving the image of the elongated slot, determining a first actual center coordinate value ($Y_a$) of the elongate slot in a direction normal to the table surface based on the image, a second actual center coordinate value ($X_a$) of the elongate slot in a direction normal to the axis based on the image, calculating the difference ($Y_d, X_d$) between the first and second actual center coordinate values ($Y_a, X_a$) and respective predetermined target center coordinate values ($Y_t, X_t$), and delivering the respective difference center coordinates value ($Y_d, X_d$) signals.

In yet another aspect of the present invention a method is provided for inspecting the position of an elongate slot in a piece part, comprising the steps of:

taking a picture of a piece part and storing an image of an actual elongate slot in a processing means;

determining first and second extreme coordinate end positions ($Y_1, Y_2$) of the actual elongate slot in a direction spaced normally from a surface supporting the piece part;

calculating an actual center coordinate position ($Y_a$) of the image of the actual elongate slot in a direction normal relative to the surface based on the first and second extreme coordinate end position ($Y_1, Y_2$) of the actual elongate slot;

determining third and fourth extreme end positions ($X_1, X_2$) of the image of the actual elongate slot in a direction normal relative to an axis of rotation of the supporting surface;

calculating an actual center coordinate position ($X_a$) of the image of the actual elongate slot in a direction normal relative to the axis based on the third and fourth extreme coordinate end positions ($X_1, X_2$);

determining first and second difference center coordinate values ($Y_d, X_d$) between the actual ($Y_a, X_a$) and predetermined target ($Y_t, X_t$) center coordinate values; and recording the first and second difference coordinate values ($Y_d, X_d$).

BRIEF DESCRIPTION OF THE DRAWINGS

FIG. 2 is a diagrammatic cross-sectional view taken along lines 2—2 of FIG. 1;

FIG. 3 is a block diagram of an inspection system of the inspection device of FIG. 1;

FIG. 4 is a diagrammatic view of a monitor of the inspection system of FIG. 3 showing the key inspection parameters;

FIG. 5 is a representative graph showing target and actual elongate slot positions and the related actual and target coordinate centers;

FIG. 6 is a graphical representation of an image of the actual elongated slot and the key measurement parameters associated with the accuracy of position, angle, and area;

FIG. 7 is a flow chart disclosing the sequence of operation of the inspection device;

FIG. 8A–8B is a flow chart describing steps of the method of determining the center and true positions of an actual elongate slot being inspected by examining the image thereof;

FIG. 8C is a flow chart disclosing the method of determining an angle of the actual elongate slot being inspected by measuring the image thereof; and FIG. 8D is a flow chart disclosing a method of determining an area of the actual elongate slot being inspected by analyzing the image thereof.

BEST MODE FOR CARRYING OUT THE INVENTION

Figure 1:
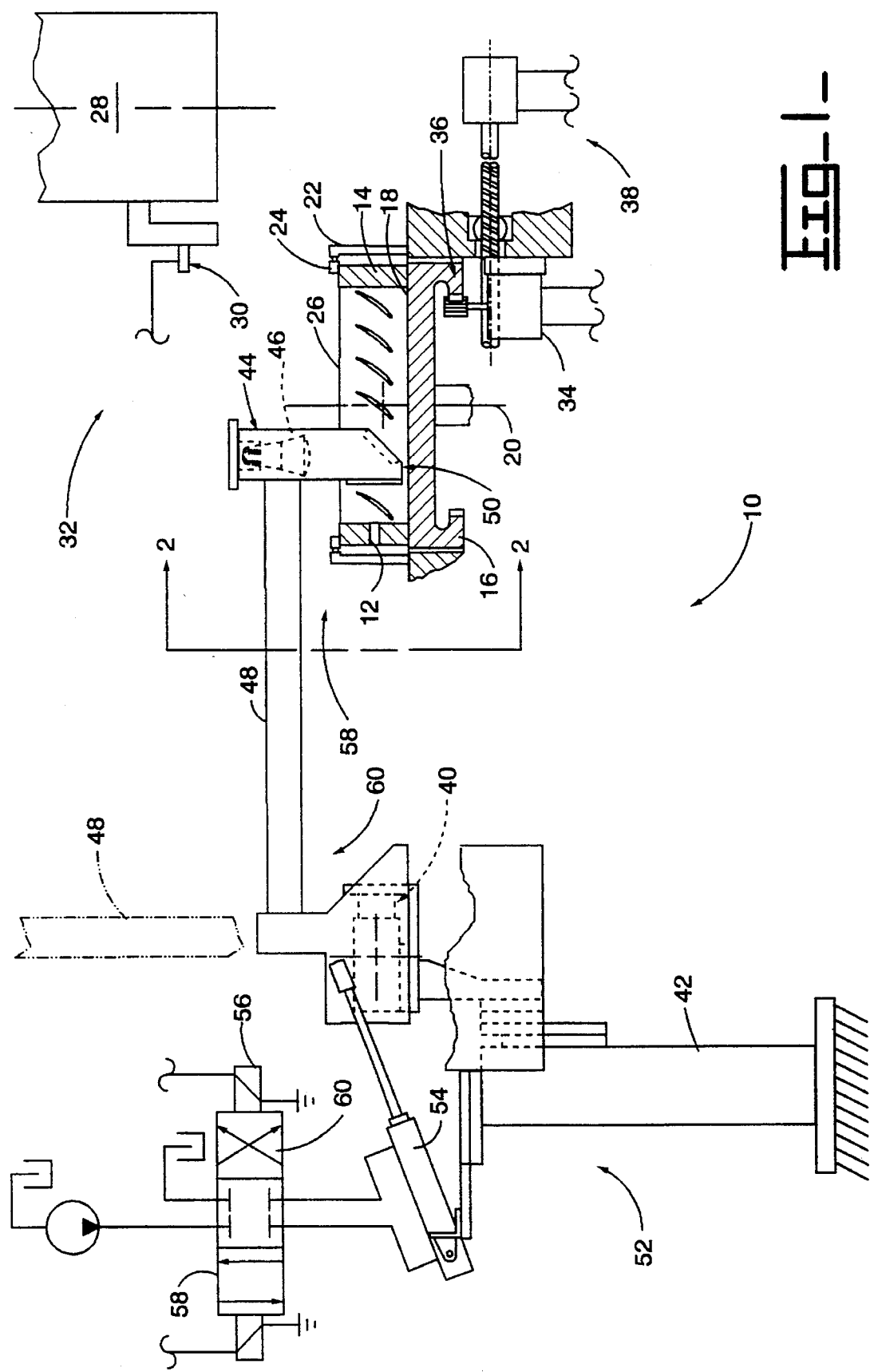
FIG. 1 is a diagrammatic view of an inspection device for determining the accuracy of an irregular shaped elongated slot disposed in a piece part.

With reference to the drawings and particularly FIG. 1, an inspection device for determining the accuracy of each of a plurality of elongate slots 12 disposed through a piece part 14 is shown. In particular, the inspection device 10 is a visual inspection device, and the piece part is shown as cylindrical ring or shroud having a plurality of equally spaced apart irregular shaped radially oriented slots disposed in the piece part 14. The visual inspection device 10 includes a turntable 16 having a supporting surface 18 upon which the piece part 14 is supported during inspection. Preferably, the piece part 14 is positioned on the supporting surface 18 so that an axis of rotation 20 of the turntable 16 lies along an axis of symmetry of the piece part 14.

A plurality of clamps 22, each having a roller 24, are connected at spaced locations on a stationary portion of the turntable 16. The rollers are rollingly engageable with an end 26 of the piece part 14 and permit indexing of the piece part by rotation of the turntable while maintaining clamping engagement with the piece part 14. The clamps 22 are selectively movable in at least an elevational direction relative to the turntable (normal to the surface 18) to permit removal and installation of the piece part 14. Movement of the clamps may be achieved manually or by any suitable well known drive means, such as a screw drive or jack arrangement (not shown).

A punching apparatus 32, which is shown elevationally and transversely spaced from a punching position relative to the piecepart 14, has a ram 28 and a punch 30 connected to the ram 28. The punch is provided for punching the plurality of elongate slots 12 at predetermined spaced locations through the piece part 14. The punching apparatus 32 includes an indexing means 34 such as a stepper motor for indexing the piece part 14 during both punching and visual inspection operations. It is to be noted that other devices, such as fluidic motors and the like may be used to index the piece part. The indexing means 34 is connected to the turntable 16 by a gear set 36. The indexing means 34 rotates the turntable 16 about the axis 20 and precisely locates the piece part 14 for both the inspection and punching operations.

A linear means 38, such as a ballscrew drive and a motor assembly, but not limited thereto, is connected to the turntable. The linear means is actuatable to move the turntable 16 in directions transverse the axis 20 between a first position, as shown in FIG. 1, at which the turntable, and particularly the piece part 14 supported thereon, is within a predetermined visual inspection focal distance from a camera means 40, and a second position at which the ram 28 is axially aligned with the turntable 16 for elongate slot punching purposes. It should be noted that the axis 20 is a vertical axis (Y) and the axis of the linear means 38 is oriented substantially perpendicular thereto and in a horizontal direction (X). The camera means 40 is mounted on a support 42, such as a pedestal or any other suitable supporting base. The camera means 40 is preferably a charge couple device which is capable of taking a picture of the piece part 14 and one of the elongate slots 12 and delivering an image of the slot. The camera means is preferably a Panasonic Model GPMF702 high resolution camera. It should be noted that any camera means with similar capabilities is a suitable substitute.

An illumination means 44 is provided for directing backlighting towards the piece part 14 and for illuminating the elongate slot 12 being photographed. The illumination means 44 is moveable relative to the piece part 14 between a first position at which backlighting is directed towards the elongate slot and a second position spaced from the backlighting location. The illumination means 44 is shown in solid lines at the first position and in hidden lines at the second position. The purpose of being able to move between the first and second positions is based on the need to keep the backlighting device clean and free from contaminants and to allow the turntable 16 to be moved to the punching operation. Since the turntable is used for both inspection and machining, it is necessary to move the illumination means to the second position when the punching operation is being performed. The illumination means 44 includes a lamp 46 which is mounted on an arm 48 pivotably connected to a support 42. A mirror and lens system 50 directs the backlighting to the particular elongate slot being recorded as an image for examination purposes. It should be noted that a first end portion of the arm 48 is pivotably connected to the support 42 and the lamp 46 is connected to a second end portion of the arm 48 spaced from the first end portion.

An actuator means 52 is connected to the first end portion of the arm 48 and is controllably moveable to pivotably move the arm 48 relative to said piece part 14 to place the lamp relative to the piece part 14 at one of the first and second positions of the illumination means 44. Preferably, the actuator means 52 includes a linear jack 54 of any suitable construction. The jack is preferably a fluid operated jack of any suitable construction connected to and between the arm 48 and the support 42. A control valve 56 having first and second fluid directing positions 58, 60 is movable between the first and second positions 58, 60 in response to movement of a switch means 62, for example a keypad, a toggle, a pushbutton, and the like between first and second position. The jack 54 is telescopically moveable between the first and second positions in response to movement of the control valve 56 between the first and second positions 58, 60. The illumination means 44 is moveable between its first and second positions in response to movement of the control valve 56 between the first and second positions 58, 60. The control valve 56 is preferably a three position four way valve. The control valve 56 fluidically locks the jack 54 and prevents the passing of fluid at a neutral or centered position thereof. The valve 56 is electrically actuated and moveable between the first and second positions in response to receiving an appropriate electric signal.

Referring to FIG. 2, the position of the lens system 50 of the illumination means 44 relative to a centered one of an elongate slot 14 is shown in detail. It should be noted that the position of a lens (not shown) of the camera means 40 and the center of the outer most lens of the lens system 50 are aligned to intersect axis 20. The center line of sight of the camera means 40 is aligned to intersect the axis 20 and pass through a center of the elongate slot 14 being inspected. It should be recognized that it is impossible to mechanically adjust the position of the camera means 40 and the piece part 14 accurately enough to eliminate all deviation in alignment from nominal. However, it is possible to compensate for this analytically in either hardware and software. Those skilled in the art will recognize that deviations in alignment can be measured by using circular and rectangular templates. This information is then used in the analysis to correct the measurements.

Referring to FIG. 3, a block diagram of the control system 64 of the visual inspection device 10 is shown. The camera means 40 delivers an image of the actual elongate slot 14 being inspected to a first means such as a vision system 66. The vision system 66 is connected to a third means, such as a machine controller 68 and to a second means, such as a process recording image monitoring system (PRIMS) 70. The machine controller 68 is also connected to the illumination means 44 and the turntable controls 72 which include the indexing means 34 and the linear means 38 previously discussed. The PRIMS 70 is connected to a control panel 76 which includes the switch means 62. The vision system 66, utilizes an Adept optical controller, the machine controller 68, utilizes an Allen-Bradley Series 9/240 CNC controller, and the monitoring system 70 utilizes an IBM 386 PC. The vision system 66 is connected via a serial I.O. port to PRIMS and the machine controller 68 is connected to the vision system 66 and PRIMS 70 via digital I.O. ports.

The machine controller 68 is responsible for those functions related to physical output such as moving the illumination means between the first and second position, indexing the turntable 16, and moving the turntable in a longitudinal direction transverse the axis 20.

The PRIMS 70 is the control leader. By way of the control panel 76, it facilitates an operator to interface with the machine controller 68 and the vision system 66. The PRIMS 70 provides the information processing necessary to accurately command control of the aforementioned operations, such as indexing, etc. The PRIMS 70 includes a monitor 78 having a cathode ray tube which displays various information related to key parameters generated from information based on the visual inspection of each of the slots. The monitor 78 is disclosed in greater detail in FIG. 4.

The vision system 66 is actuated by selecting "auto" by selector switch from the PRIMS 70. The selector switch is a two-position switch and is used to select either "off" or "auto". Selection is made by way of control panel 76 of the PRIMS 70. It should be noted that the selection may be made by any other input device, such as a key board or pad, a touch screen, and the like without departing from the scope of the invention. The PRIMS computer communicates to the vision system computer 66 to recall a given inspection sequence. In the "auto" position, the machine controller computer 68 signals to the vision system 66 to execute a selected inspected sequence. The vision system 66 communicates with the machine controller 68 indicating the success or failure of the inspection. It should be noted that the entering of a particular part number or operation number into the PRIMS 70 establishes specific parameters and tolerances for a given set of elongate slots 14 to be inspected. The machine controller 68 signals the vision system processor 66, by raising a snap picture signal, to perform the inspection function. As indicated above, the vision system 66 will either raise an inspection complete signal or lower an inspection failed signal. These signals are reset upon the next snap picture signal from the machine controller.

Referring to FIG. 7, a flow chart of the operation sequence for a vision check is disclosed in substantial detail. The operator selects by way of the PRIMS control panel 76 a vision check operating sequence. The PRIMS computer 70 signals the machine controller 68 of the selection. The machine controller 68, based on preselected instructions, as identified in block 80, commands the lowering of the clamp 22 into engagement with the piece part 14. As indicated above, the clamp 14 will maintain the piece part 14 at a desired position relative to the axis 20. Upon successful completion of the clamp engaging operation, the machine controller 68, block 82, will command the linear means 38 to transversely move the turntable 16 to a location a preselected linear distance from the camera means 40 in order to place the piece part 14 at a preselected focal length from the camera 40 and within a preselected field of view of the piece part 14. Upon satisfactory completion of this operation, the switch means 62 is actuated.

Actuation of switch means 62 will cause the illumination means block 84, to move to the first position thereof and backlight the piece part 14. It is to be noted that the lamp 46 of the illumination means 44 is lit whenever the illumination means 44 is at the first position. This can be achieved in a variety of ways such as by mechanical, optical or magnetic switches (not shown).

Upon completion of the operation in block 84 the piece part 14 is indexed by the machine controller 68 to a position at which the first elongate slot is properly aligned with the camera means 40 and within a field of view of the camera means 40. The indexing operation is identified in block 86. As previously discussed, the machine controller 68 delivers commands to the indexing means to accurately index the piece part 14 for inspection purposes.

The machine controller 68 then delivers a snap picture signal. As indicated in block 88, the vision system commands the camera means to take a picture of the elongate slot 12 whenever the snap picture signal is received from the machine controller 68. The vision system 66, as indicated in block 90, analyzes certain characteristics of the elongate slot 12 relative to the piece part 14 and delivers responsive signals to the PRIMS 70. The analysis of the slot image will be dealt with in greater detail during discussions of FIGS. 8A–8D.

As indicated in block 92, the decision concerning if the instant slot is the last slot is addressed. If additional slots are to be analyzed, the machine controller 68 indexes the piece part 14 to the next slot position and the sequence as set forth in blocks 88 and 90, as previously discussed, are performed until all the blocks are analyzed.

Upon completion of the inspection of each and every slot 12, the machine controller 68 delivers a control signal to the illumination means 44. As indicated in block 96, the illumination means 44 is moved by the actuator means 52 to the second position. At this position, the illumination means is spaced from the first position, the piece part 14 backlighting position.

With the illumination means at the second position, the piece part 14 is clear from possible interference with the illumination means and movable transversely relative to the axis 20 to an unload position, as indicated in block 98. To achieve this, the machine controller 68 commands the linear means 38 to rotate and move the table 16 so that the piece part may be removed. Upon completion of the step of block 98, the clamps 22 are released from clamping engagement with the piece part 14. Thus, the piece part 14 is freed for removal from being supported on the turntable surface 18. This step completes the sequence of operation of visual inspection of the plurality of elongate slots disposed in piece part 14.

Figure 8A:
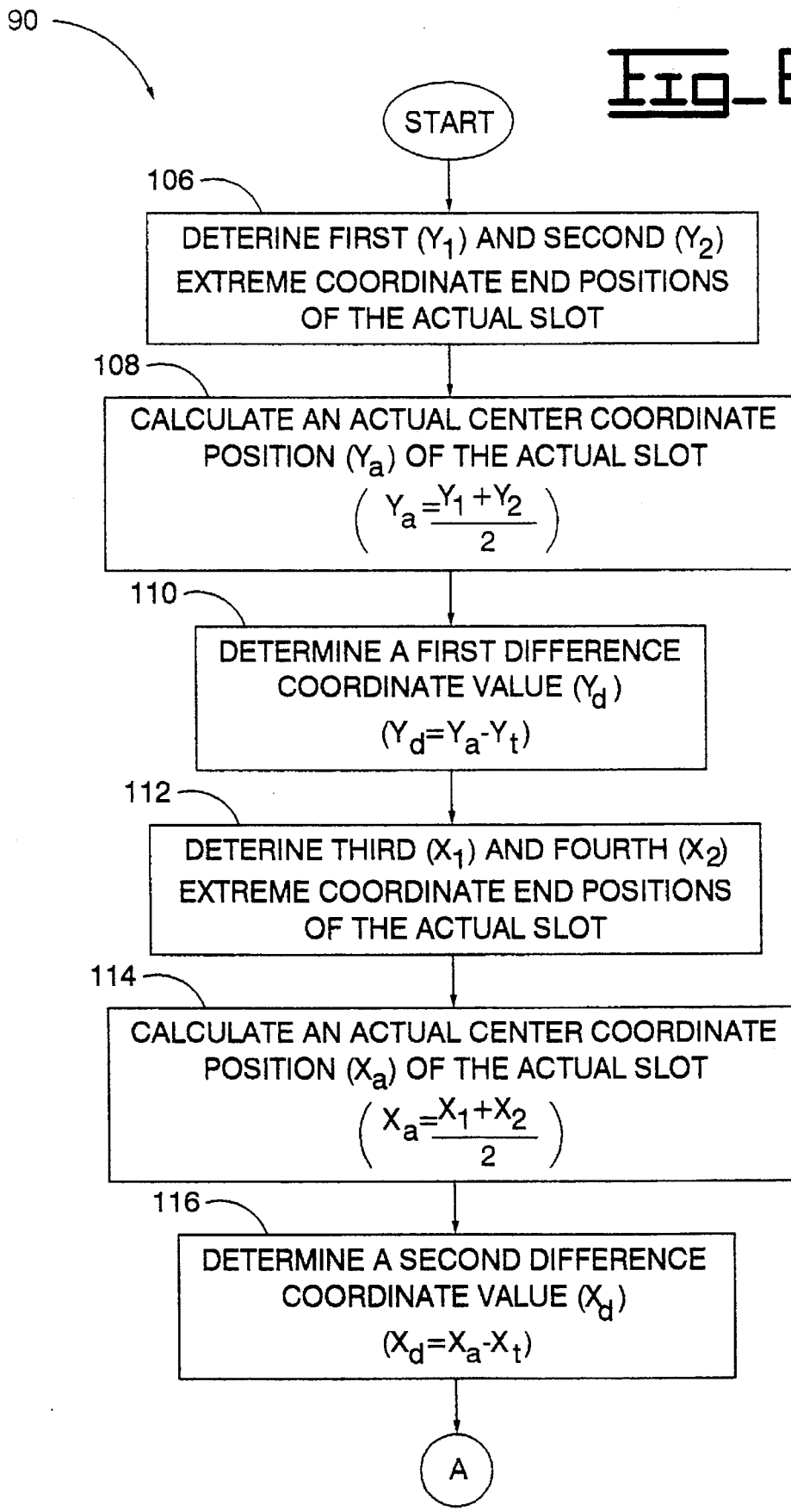

Referring to FIGS. 5, 6, 8A and 8B. FIG. 5 shows a coordinate plot with a target elongate slot 102 and an actual elongate slot 104 such as viewed by the camera means 40 when slot 104 is substantially aligned to intersect axis and within the field of view of the camera means 40. FIG. 6 shows the image of the actual slot as taken by camera means 40. FIG. 8A and 8B discloses the steps associated with the analysis of block 90, and particularly those steps for determining a coordinate and a true position difference for an image of the actual elongate slot as viewed by the camera means 40. A target slot 102 has a predetermined nominal value for each key parameter of the instant slot being inspected. An actual slot 104 has a value for each key parameter determined from an image of the instant slot being viewed by the camera means 40. The target and actual slot values, that are considered key, are compared with each other and the results of this comparison are recorded and/or displayed on monitor of 78, as shown in detail on FIG. 4.

It has been determined that a center coordinate position of an elongate slot is one of the key parameters. Since an irregular shaped elongate slot has no actual center, due to the lack of symmetry, it has been determined that a theoretical center for comparison purposes can be identified by determining a midpoint center between the extreme end points of the elongated slot in each of the "X" (direction transversely normal to the axis 20) and a "Y" (direction normal to the surface 18) coordinate directions.

Referring to FIGS. 5, 6 and 8, in order to determine the center of the actual elongate slot 104 in the "Y" direction, the first $Y_1$ and second $Y_2$ extreme coordinate end positions of the actual elongate slot based on the image is identified (block 106). The upper $Y_1$ and lower $Y_2$ most ends of the image are selected based on predetermined areas (shown in FIG. 6 by rectangular outlines). Each area includes a predetermined number of pixels, the upper most pixel within the outline of the image is selected. An actual center coordinate position $Y_a$ of the actual slot is then calculated, $$Y_a = \frac{Y_1 + Y_2}{2}$$

As shown in block 110, a first difference coordinate value $Y_d$ is determined between the actual and the target center coordinate positions by equation $Y_d = Y_a - Y_t$.

In block 112, the third $X_1$ and fourth $X_2$ extreme coordinate end positions, the extreme left and right side positions, are determined (FIG. 6). In block 114, the actual center coordinate position $X_a$ of the actual slot image is calculated in accordance with the following equation:

$$X_a = \frac{X_1 + X_2}{2}$$

In block 116, a second difference center coordinate value $X_d$ is calculated based on the equation $X_d = X_a - X_t$. The target and actual coordinate values $X_t, X_a$ as well as the difference therebetween $X_d$ are shown in FIG. 5.

As indicated in block 118, the first and second difference coordinate values $Y_d, X_d$ are delivered to PRIMS 70 and recorded, such as in a file. The sum of each of the first and second difference coordinate values $Y_d, X_d$ and the respective target coordinate center values $Y_t, X_t$ are determined in block 120. These sums are displayed on monitor 78 (FIG. 4) as the actual hole values in the "X" and "Y" positions. Blocks 122 and 124 deal with displaying these values as the actual center and target center coordinate values.

The true position $T_p$ calculation and display is dealt with in logic blocks 126–136. As indicated in block 126, the true position $TP_a$ of the actual elongate slots is defined as 2 times the square root of ($X_d$) squared plus ($Y_d$) squared. The true position of the actual elongate slot $TP_a$ takes into account the "X" and "Y" components of points and measured in thousands of an inch. The actual true position value $TP_a$ is compared to a target true position value $TP_t$ and a true position value difference $TP_d$ is determined, in block 128. The true position value difference $TP_d$ is recorded in block 130, such as by storing $TP_d$ in a record. In particular a signal representing the difference true position value $TP_d$ is delivered from the vision system 66 to PRIMS 70 and stored in a record.

In block 132, the target $TP_t$ and difference $TP_d$ true position values are combined in PRIMS 70 and displayed as the actual true position value $TP_a$ on monitor 78. In block 136, the PRIMS 70 delivers a signal to the monitor 78 to display the related target true position value $TP_t$. As shown in FIG. 4, a display of the actual and target true position values is illustrated.

Referring to FIG. 8C, a block diagram showing the steps of a method associated with determining an actual angle of orientation α of the irregular shaped elongate slot being analyzed in block 90. It has been determined that the angle α of the elongated slot is a key feature in determining the acceptability of the accuracy of the elongate slot. The steps as shown in FIG. 8C are carried out by the vision system 66. In block 138, a predetermined portion "C" (FIG. 6) of an edge of the image of the actual slot 14 is selected. In block 140, the vision system 66 and particularly the processor thereof, using linear regression, fits a line 154 tangent to the selected portion "C" of the arcuate edge. The vision system 66 measures the actual angle α of the tangent line 154 relative to the supporting surface 18. If the value of the angle α is greater than 90 degrees, the processor uses the compliment of the angle. This information is reported by a signal to PRIMS 70.

Once the angle α is determined, the vision system 66 calculates a difference angle value θ between the actual angle α and a predetermined target angle β and records the difference angle value θ in PRIMS 70 by delivering a signal to PRIMS 70. This is shown in blocks 144 and 146.

PRIMS 70 calculates the sum of the difference angle value θ and the target angle value β (block 148) and displays the sum of these two values as the actual angle value α (block 150) on the monitor 78, in degrees, (FIG. 4). The image of the actual elongate slot 104, the angle α of the tangent line 154, and the predetermined portion "C" of the arcuate edge are all clearly identified in FIG. 6.

As indicated in block 152, PRIMS delivers a signal to command the monitor 78 to display the target angle value β in a manner shown on FIG. 4. The angle value β was previously stored in a record in PRIMS 70.

The remaining key feature of the irregular shaped elongate slot 12 is determined in accordance with the logic steps of the method as set forth in the flow chart shown in FIG. 8D. To best understand the steps of FIG. 8D, the reader should additionally refer to FIGS. 3, and 6. It has been determined that the ultimate key value in determining the accuracy of an irregular shaped elongate slot 12 relative to the piece part 14 should be based on the area of the image $A_a$ relative to a predetermined target area (nominal area) of a target image $A_t$. As shown in block 156, the vision system 66 counts the number of pixels contained within an area $A_a$ of the actual elongate slot image 104.

The actual area value $A_a$ is determined by multiplying the number of pixels by an area value of one pixel as shown in block 158. It should be recognized that the pixels each have substantially the same area value. The total area value $A_a$, such as in square thousands of an inch, is reported to the PRIMS 70. In block 160, a difference area value $A_d$ between the actual area value $A_a$ and a predetermined target area value $A_t$, as determined by the vision system 66 (processor), is delivered for recording purposes to PRIMS 70. The difference area value $A_d$ is reported in square thousands of an inch. The PRIMS 70 calculates the sum of the difference area $A_d$ and the target area $A_t$ and delivers a signal to the monitor 78 to display the summed area value as the actual area value $A_a$.

Throughout the discussion, calculation of the difference coordinate values $Y_d, X_d$, the difference angle value θ, the area value $A_d$ and true position value $TP_d$ were performed before representative values were delivered from the vision system to PRIMS 70. The reason for this is to reduce the amount of data delivered over the serial port from the vision system 66 to PRIMS 70 and thereby reduce the data transmission time. It should be recognized that it is also appropriate to deliver directly to PRIMS 70 the actual values of the center coordinate $X_a$ and $Y_a$, the actual angle value α, the actual area value $A_a$ and the actual target value $TP_a$ image without departing from the spirit of the invention.

With reference to FIG. 6, as previously indicated each of the calculations performed are based on the image of the actual slot 104. To simplify and accelerate the evaluation, the determination of each of the key values is based on this image and specific points located within boundary areas defined by the rectangular outlines within the coordinate system. For example, $Y_1$ is located within a rectangle at the upper left hand corner of the image of FIG. 6 and selected based on the upper most pixel turned on within the boundary (the uppermost point within the image of the elongate slot 12 being inspected).

Industrial Applicability

With reference to the drawings, the visual inspection device 10 provides an accurate way of automatically determining the accuracy of location, orientation, and size of an irregular shaped elongate slot 12. The machine controller 68, as directed by PRIMS 70 controls indexing of the turntable 16, and sequentially places each of the elongate slots 12 being inspected, within the field of view of the camera means 40 for image recording purposes. The camera means 40 is accurately placed so that the vertical axis 20 of the turntable 16 and the supporting surface 18 are substantially parallel to the vertical and horizontal axes, respectively, of the camera means 40. This reduces the amount of correction required during set up of the inspection device 10. Further, this accuracy enables the depth of field of the camera means 40 to be relatively small (2 inches×2 inches) which improves the sharpness of the image.

Since the illumination means 44 is positioned to direct lighting towards the elongated slot 12 of the piece part 14 being recorded, the quality of the image being obtained is enhanced. As previously stated movement of the illumination means 44 between the first and second positions 58, 60, maintains the cleanliness of the light source, enables immediate inspection of the piece part after punching and while fixtured on the turntable 16 of the punching apparatus 32, and protects the illumination means 44 from inadvertent damage.

The image of the elongate slot 12 being recorded by the camera means 40 is analyzed by the vision system 66 in accordance with preprogrammed instructions as discussed above. The results of this examination are delivered to the PRIMS 70 and recorded before subsequent use.

Referring to FIG. 4, in particular, certain information concerning the accuracy of the elongate slots 12 are displayed on monitor 78. As previously indicated, the actual and target values for the true $TP_a$, $TP_t$ and the coordinate center $Y_a, X_a, Y_t, X_t$ positions, the angle α, β and the area $A_a$, $A_t$ are displayed. Optionally, a low and/or high limit may be displayed for each of the values as shown. Equivalent information for a second elongate slot is displayed in a like manner beneath the previously mentioned displayed information. Examination of the drawing of FIG. 4 should provide the reader with a clear understanding of the information being displayed. This information is examined by an operator and evaluated based on predetermined acceptable standards.

As previously discussed, the difference center coordinate position values $Y_d, X_d$, the difference angle value θ, the difference area value $A_d$ and the difference true position value $TP_d$ each provide valuable information capable of assisting an inspector in determining whether or not a particular group of irregular shaped elongate slots 12, in the piece part 14, are within acceptable tolerances without the guesswork, like that associated with the manual method described above.

These key values $Y_d, X_d$, θ, $TP_d$ and $A_d$ are accessible at a later date for further evaluation such as by receiving a printed copy of the record or displaying such information on the monitor 78.

Each time an elongate slot 12 is analyzed, the PRIMS 70 delivers a signal to the machine controller indicating the success or failure of the image recordation and analysis. Based on this signal, the machine controller will either instruct the vision system 66 to take another picture or deliver a signal to the turntable controller 72, to index the turntable to the next position at which an adjacent slot 12 is in alignment with the camera means 40. The machine controller 68 will deliver a signal to the vision system 66 indicating the need for a second picture to be taken.

This routine is carried on until the entire ring of elongate slots are photographed and the key analytical information concerning each of the slots 12 is recorded.

Other aspects, objects and advantages of the present invention can be obtained from a study of the drawings, the disclosure, and the appended claims.

I claim:

1. An inspection device for automatically determining an accuracy of an elongate slot disposed through a piece part, comprising:

a punching apparatus having a turn table, said turn table having a supporting surface and supporting a piece part, said punching apparatus punching an elongate slot through said piece part, said piece part being positioned on the supporting surface at a preselected location relative to an axis of rotation of the supporting surface;

illumination means for directing back lighting towards the piece part and illuminating the elongate slot;

camera means for taking a picture of the illuminated elongate slot and delivering an image of said elongate slot, said piece part being located between the camera means and the illumination means;

first means for receiving the image of said elongate slot, determining a first actual center coordinate value ($Y_a$) of said elongate slot in a direction normal to said supporting surface based on said image and a second actual center coordinate value ($X_a$) of the elongate slot in a direction normal to said axis based on said image, calculating a difference ($Y_d, X_d$) between the first and second actual center coordinate values ($Y_a, X_a$) and respective predetermined target center coordinate values ($Y_t, X_t$), determining an actual angle value ($\alpha$) of the elongate slot relative to the supporting surface based on said image, comparing the actual angle value ($\alpha$) to a target angle value ($\beta$), and delivering respective difference center coordinate value ($Y_d, X_d$) and angle value ($\theta$) signals.

2. An inspection device, as set forth in claim 1, including a second means for adding the difference center coordinate values ($Y_d, X_d$) and the respective target center coordinate values ($Y_t, X_t$) and displaying on a monitor a respective sums.

3. An inspection device, as set forth in claim 1, wherein said first means including means for determining an actual area value ($A_a$) based on said image, comparing the actual area value ($A_a$) to a target area value ($A_t$) and delivering a difference area value ($A_d$) signal.

4. An inspection device, as set forth in claim 3, wherein said piece part includes a tubular ring having a plurality of equally spaced elongate slots disposed radially therethrough and including indexing means for rotating said supporting surface about said axis and placing one of said plurality of elongate slots within a field of view of said camera and along a line of sight extending from said camera and intersecting said axis of rotation of the supporting surface.

5. An inspection device, as set forth in claim 3, including a second means for receiving said center coordinate, angle, and area difference value signals, recording said differences, combining the difference center coordinate ($Y_d, X_d$) and target center coordinate ($Y_t, X_t$) values, combining the difference angle ($\theta$) and target angle ($\beta$) values, combining the difference area ($A_d$) and target area ($A_t$) values, and displaying on a monitor a combined difference and target coordinate, angle and area values.

6. An inspection device, as set forth in claim 1, wherein said first means including means for determining an actual true position value ($TP_a$) of the elongate slot based on said difference center coordinate values ($Y_d, X_d$), comparing the actual true position value ($TP_a$) to a target true position value ($TP_t$) and delivering a difference true position value signal.

7. An inspection device, as set forth in claim 1, including a second means for receiving said difference center coordinate value signals, and recording said difference center coordinate values ($Y_d, X_d$).

8. An inspection device, as set forth in claim 1, including a second means for receiving said difference true position value ($TP_d$) signal, recording said difference true position value ($TP_d$), combining said target ($TP_T$) and difference ($TP_d$) true position values and displaying on a monitor said combined target ($TP_T$) and difference ($TP_d$) true position values.

9. An inspection device, as set forth in claim 1, wherein said illumination means being movably connected to a support and including means for moving said illumination means between a first position at which light from said illumination means is directed toward back lighting said piece part and a second position spaced from said first position at which light from said illumination means is directed away from back lighting said piece part.

10. An inspection device, as set forth in claim 9, wherein said illumination means includes:

an arm having first and second end portions and being pivotally connected at the first end portion to said support;

a lamp connected to the second end portion of the arm; and an actuator means connected to the first end portion of the arm and controllably movable to pivotally move said arm relative to said piece part and place said lamp relative to said piece part at one of the first and second positions of the illumination means.

11. An inspection device, as set forth in claim 10 wherein said actuator means includes a linear fluid operated jack.

12. An inspection device, as set forth in claim 11, including;

a selectively actuatable switch movable between first and second positions; and a control valve connected to said linear fluid operated jack and said selectively actuatable switch, said control valve being moveable between first and second positions in response to movement of said switch between said first and second positions, said jack being telescopically movable between first and second positions in response to movement of said control valve between first and second positions, said illumination means being movable between said first and second positions in response to movement of said control valve between said first and second positions.

13. An inspection device, as set forth in claim 9, including a third means for delivering a control signal and moving said illumination means between said first and second positions.

14. A method for inspecting a position of an elongate slot in a piece part restrained on a supporting surface of a turn table of an elongate slot punching apparatus, comprising the steps of:

taking a picture of a piece part and storing an image of an actual elongate slot in a processing means;

determining first ($Y_1$) and second ($Y_2$) extreme coordinate end positions of the image of the actual elongate slot in a direction spaced normally from the supporting surface of the turn table supporting the piece part;

calculating an actual center coordinate position ($7_a$) of the image of the actual elongate slot in a direction normal to said surface based on said first ($Y_1$) and second ($Y_2$) extreme coordinate end positions of the actual elongate slot;

determining third ($X_1$) and fourth ($X_2$) extreme end positions of the image of the actual elongate slot in a direction normal relative to an axis of rotation of the supporting surface;

calculating an actual center coordinate position ($X_a$) of the image of the actual elongate slot in a direction normal relative to said axis based on said third ($X_1$) and fourth ($X_s$) extreme coordinate end positions;

determining first and second difference center coordinate values $(Y_d, X_d)$ between the actual $(Y_a, X_a)$ and predetermined target $(Y_t, X_t)$ center coordinate values; and recording the first and second difference coordinate values $(Y_d, X_d)$;

fitting a line tangent to an image of said actual elongate slot at a predetermined portion along an edge of the actual elongate slot;

measuring an actual angle ($\alpha$) of the tangent line relative to the supporting surface;

determining a difference angle value ($\theta$) between the actual angle ($\alpha$) of the tangent line and a predetermined target angle ($\beta$); and recording the difference angle value ($\theta$).

15. A method, as set forth in claim 14, including the steps of:

counting a number of pixels contained within an actual area surrounding the image of the actual elongate slot;

determining an actual area value ($A_a$) of the area surrounding the image of the actual elongate slot by multiplying the number of pixels by a predetermined area of one pixel;

determining a difference area value ($A_d$) between the actual area value ($A_a$) and a predetermined target area value ($A_t$); and recording the difference area value ($A_d$).

16. A method, as set forth in claim 15, including the steps of:

adding the first and second difference center coordinate values $(Y_d, X_d)$ to the respective target center coordinate values $(Y_t, X_t)$;

adding the difference angle value ($\theta$) to the target angle value ($\beta$);

adding the difference area value ($A_d$) to the target area value ($A_t$); and displaying on a monitor each of a sums of the added center coordinate values, the added angle values, and the added area values.

17. An inspection device for automatically determining an accuracy of an irregular shaped elongate slot disposed through an annular ring prior to removal of the annular ring from a punching apparatus, comprising:

a turntable having a supporting surface and supporting said annular ring having said irregular shaped elongate slot disposed therethrough, said annular ring being positioned on the supporting surface at a preselected location relative to an axis of rotation of the supporting surface;

illumination means for directing back lighting towards the annular ring and illuminating the irregular shaped elongate slot;

camera means for taking a picture of the illuminated irregular shaped elongate slot and delivering an image of said irregular shaped elongate slot, said annular ring being located between the camera means and the illumination means;

first means for receiving the image of said irregular shaped elongate slot, determining a first actual center coordinate value ($Y_a$) of said irregular shaped elongate slot in a direction normal to said table surface based on said image, determining a second actual center coordinate value ($X_a$) of the irregular shaped elongate slot in a direction normal to said axis based on said image, determining an actual angle value ($\alpha$) of the irregular shaped elongate slot relative to the turn table surface based on said image, and storing said first and second actual center coordinate $(Y_a, X_a)$ and angle values ($\alpha$).

18. An inspection device, as set forth in claim 17, wherein said first means determining an actual area value ($A_a$) based on said image, and storing said actual area value ($A_a$).

* * * * *